United States Patent [19]

Babcock et al.

[11] Patent Number: 4,698,484
[45] Date of Patent: Oct. 6, 1987

[54] WELDING MONITORING SYSTEM

[75] Inventors: Stephen G. Babcock, Westlake Village; Gerald E. Dyer, Canoga Park; Stephen S. Gordon, Tarzana, all of Calif.

[73] Assignee: The United States of America as represented by the United States National Aeronautics and Space Administration, Washington, D.C.

[21] Appl. No.: 10,942

[22] Filed: Feb. 5, 1987

[51] Int. Cl.⁴ .............................................. B23K 9/10
[52] U.S. Cl. ......................... 219/130.01; 219/124.34; 219/136
[58] Field of Search ............... 219/124.34, 136, 130.01

[56] References Cited

U.S. PATENT DOCUMENTS 4,532,408 7/1985 Richardson ................... 219/130.01
4,599,506 7/1986 Burke et al. .................... 219/124.34

Primary Examiner—Clifford C. Shaw
Attorney, Agent, or Firm—Joseph H. Beumer; John R. Manning; Leon D. Wofford, Jr.

[57] ABSTRACT

A welding monitoring system is constructed having an arc welder (16) mounted in an enclosure (12) containing a pair of periscopically positioned mirrors (56, 60). A welding electrode (64) extends from the welder (16) through an opening (58) in the mirror (56) and through an opening (62) in the enclosure (12). The mirror (56) is inclined to reflect an image of a welding operation to the mirror (60), which in turn is inclined to reflect the image through an opening (72) in the enclosure (12) to a third mirror (98). This mirror (98) is mounted in an adjoining region (100) between support members (84, 86) which are coupled perpendicularly to each other, with one member (86) coupled to the enclosure (12) by a rotatable coupling (92). The coupling (92) allows the enclosure (12) and the welder (16) to be rotated about an axis (71) and locked in a selected position by set screws (88).

A mirror (98) reflects the welding image to a receiving lens (36) which is coupled via a rotatable coupling (96) to a vertical support member (34). The coupling (96) allows the enclosure (12) and the welder (16) to be rotated about an axis (81) and locked into a selected position by a set screw (94).

A receiving lens (36) is coupled via a fiber optic bundle (38) to an optical filter unit (40) where selected wavelengths of light are filtered from the welding image. The filter unit (40) is in turn coupled to an enlarger (44) which enlarges the welding image and passes it to a camera (46). The camera (46) is connected to an electronic eclipser (48) which selectively darkens the brightest portions of the welding image. Next, the image is recorded by a video tape recorder (50) and displayed by a monitor (52).

10 Claims, 5 Drawing Figures

WELDING MONITORING SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

TECHNICAL FIELD

This invention relates generally to welding monitoring systems, and more particularly to a remote monitoring system in which an arc welder is mounted in a periscopic enclosure which directs an image of a welding operation through rotatable couplings for viewing.

BACKGROUND OF THE INVENTION

Remote welding monitoring systems have been developed for observing robotic and manual welding operations as they occur. One such system utilizes an arc welder having a welding electrode longitudinally positioned in and extending through a cylindrical housing. This housing in turn is coupled to an enclosure containing a pair of mirrors in a periscopic configuration, with the welding electrode passing through an opening in one of the mirrors. This electrode mirror is positioned adjacent an opening in the enclosure through which the welding electrode passes to a workpiece. An image of the welding operation is obtained through this opening and is reflected by the electrode mirror to a second mirror, which in turn reflects the image to a lens. The image is then coupled by a fiber optic bundle to an optical/electrical system which conditions the optical image and converts it to a video signal which is ultimately displayed on a video monitor or recorded. This system permits sensitive electronic components to be remotely located from a harsh welding environment and also provides a measure of safety for the human operator, which is a particularly sensitive issue with regard to robotic operations.

Difficulties have arisen, however, because design considerations of the monitoring system make it cumbersome to position the welding torch in many of the various attitudes necessary to perform welding tasks. To do this with the current design, it is necessary to reposition the torch, the monitoring system, and the optics. Obviously, the man-hours spent in manipulating components of this configuration of monitoring system while repositioning the torch is expensive, and further, there may occur an inordinate component failure as with fiber optic bundles, as individual fibers are prone to be broken.

It is the object of this invention to provide a welding monitoring system which allows the arc welder to be readily positioned while leaving the optical system relatively undisturbed.

SUMMARY OF THE INVENTION

In accordance with this invention, a welding monitoring system is constructed having an enclosure containing first and second mirrors in a periscopic configuration. The first mirror has an opening, and this first mirror is positioned between first and second axially aligned openings in parallel sides of the enclosure. A welder having a cylindrical housing open at one end is coupled at this open end to the first opening in the enclosure. A welding electrode is longitudinally positioned in the housing and extends through the open end of the housing, the opening of the first mirror, and the second opening of the enclosure. The first mirror is inclined 45° with respect to the electrode and reflects an image of the welding operation taken through the second opening of the enclosure to the second mirror, which is positioned to reflect the image through a third opening of the enclosure. This third opening is perpendicular to and to one side of the electrode passing through the first and second openings and is connected via a first rotatable coupling to a first tubular support member. This first tubular support member is connected perpendicular to and at one end of a second tubular support member. A third mirror positioned in the adjoining region between first and second tubular support members reflects the welding image taken from the second mirror longitudinally along an interior of the second support member to a receiving lens. This lens is mounted via a telescoping, second rotatable coupling to an opposite end of the second support member.

DETAILED DESCRIPTION OF THE DRAWINGS

Figure 1:
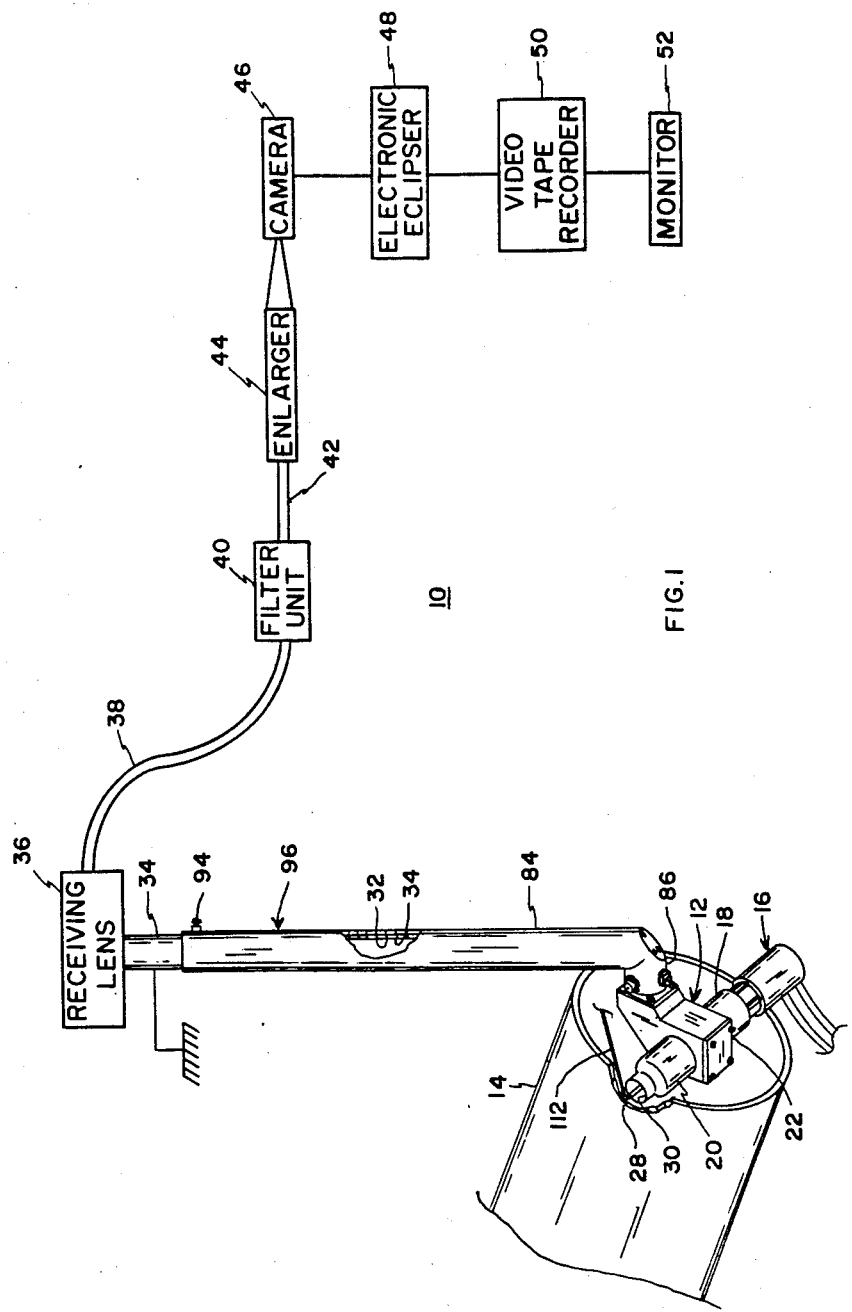
FIG. 1 is a partial schematic view of the system, with parts cut away for clarity.

Referring initially to FIG. 1, a welding monitoring system 10 is shown which enables monitoring of a welding operation from a point within an enclosure 12. A workpiece 14 is shown being welded by a gas shielded, tungsten electrode arc welder 16 having a cylindrical housing 18 and a gas cup 20. Welder 16 is mounted at end 22 of housing 18 to enclosure 12, with gas shield cup 20 mounted to enclosure 12 opposite housing 18. Enclosure 12 houses mrirors arranged in a periscopic configuration so that an image of the welding operation in region 28 on workpiece 14 is obtained through end 30 of gas cup 20. The image is then directed upward through interior 32 of fixed tubular support member 34 to a receiving lens 36. A fiber optic bundle 38 coupled to lens 36 transmits the image to a filter unit 40, which contains various optical filters which may be selected singularly or in combination to block light in the infrared and ultraviolet wavelengths. Next, the image is passed by a second fiber optic bundle 42 to an enlarger 44 where it is enlarged to provide more detail. A camera 46 coupled to enlarger 44 converts the image to a video signal and transmits it to an electronic eclipser 48, which, when used, "blacks out" the brightest portions of the image. Next, a video tape recorder 50 records the image, and a monitor 52 connected to recorder 50 displays the image while it is being recorded.

Figure 3:
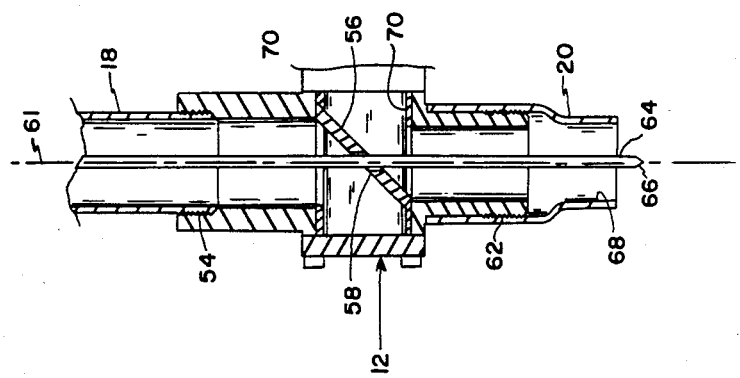
FIG. 3 is a sectional view taken along line 3—3 of FIG. 2.
Figure 2:
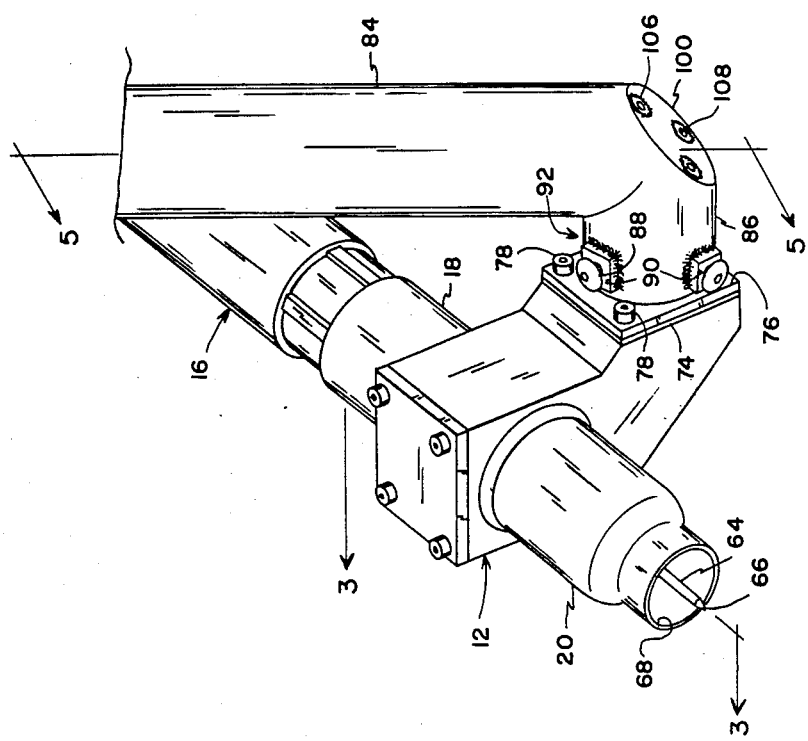
FIG. 2 is a pictorial view of a welder coupled to a portion of the system.
Figure 4:
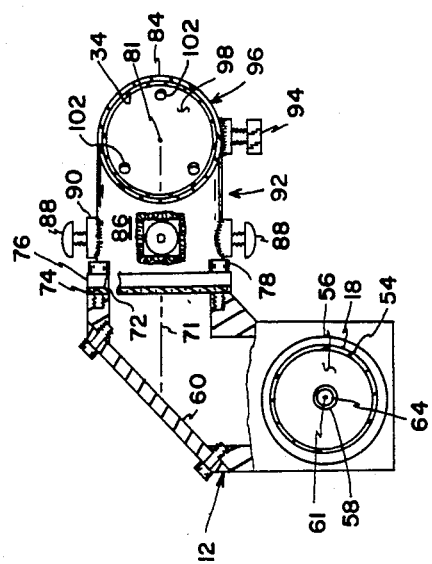
FIG. 4 is a view, partially in section, as seen from a point above a welder.

Referring now to FIGS. 2, 3, 4, and 5, a conventional gas shielded welder 16 is coupled to a threaded opening 54 in enclosure 12. Enclosure 12 houses an electrode mirror 56 having an opening 58 and a second mirror 60. Housing 18 of welder 16 is coupled to opening 54 by separating gas cup 20 from welder 16, in this case by unscrewing cup 20 and threading welder housing 18 into threaded opening 54 of enclosure 12. Cup 20 is similarly theaded onto threaded tubular portion 62 opposite opening 54 in enclosure 12. An axis 61 extends as shown in FIG. 3 longitudinally through housing 18, opening 54, opening 58 in mirror 56, portion 62 of enclosure 12, and opening 68 in gas cup 20. Electrode 64 is positioned along axis 61, passing through cup 20, opening 58 in electrode mirror 56, and conventionally mounted in torch 16 with tip 66 of electrode 64 in a normal welding relationship with opening 68 of cup 20. Electrode mirror 56 is held in place by mirror mount 70, which inclines mirror 56 45° with respect to axis 61 in order to reflect the image of a welding operation obtained through opening 68 in cup 20 to second mirror 60. Mirror 60 is inclined 45° with respect to electrode mirror 56 (FIG. 4) and is positioned to redirect the reflected welding image through opening 72 of enclosure 12. Opening 72 is concentric about an axis 71, which is to one side of and perpendicular to axis 61. Fitted over opening 72 of enclosure 12 is a transparent window 74, which is clamped in place by flange 76 and screws 78. Flange 76 is constructed having a tubular coupling member 80 in which a groove 82 is cut. Coupling member 80 is part of a rotatable coupling 92, as will be further described.

A tubular outer vertical support member 84 is constructed at one end having a short horizontal support member 86 which has an inside diameter slightly larger than the outside diameter of coupling member 80, allowing horizontal support 86 to be rotatably fitted over coupling member 80. Coupling member 80 and horizontal support 86 are concentric about axis 71 and allow rotation of enclosure 12 and welder 16 about axis 71. Set screws 88 in threaded regions 90 of horizontal support 86 are aligned with groove 82 in coupling member 80. Coupling member 80 and horizontal support 86, when assembled, form a rotatable coupling 92 which may be fixed in position by tightening set screws 88 into groove 82.

Outer vertical support 84 is similarly constructed having an inside diameter slightly larger than the outside diameter of a fixed interior vertical support 34, with a single set screw 94 which clamps onto inner fixed support 34. Inner and outer vertical supports 34 and 84 are concentrically positioned about an axis 81, which extends longitudinally through vertical supports 34 and 84. Supports 34 and 84 form a rotatable coupling 96 similar to coupling 92, which allows rotation of enclosure 12 and welder 16 about axis 81. As supports 34 and 84 are constructed of elongated tubes having differing diameters as described, they may be additionally telescoped vertically to enable adjustment in height, with set screw 94 locking exterior support 84 at any point vertically along fixed support tube 34.

Figure 5:
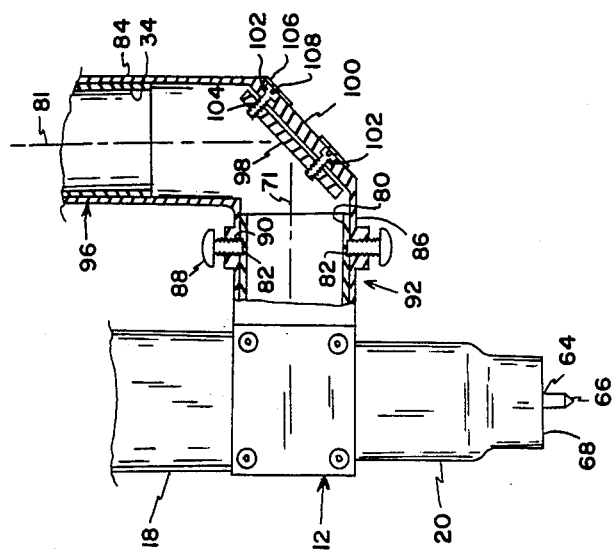
FIG. 5 is a sectional view taken along line 5—5 of FIG. 2.

A third mirror 98 is adjustably mounted in an adjoining region 100 between outer vertical support member 84 and horizontal support member 86. As shown in FIG. 5, mirror 98 is positioned 45° with respect to axes 71 and 81 and is adjustably mounted by three identical screws 102, which are threaded into threaded openings 104 in mirror 98. These screws 102 are recessed as shown in FIG. 5 and held in place in region 100 by screw retainer plates 106. Openings 108 in plates 106 allow access to screws 102 for adjustably positioning mirror 98. Mirror 98 is inclined to reflect a welding image from mirror 60 longitudinally within fixed vertical support 34 to a receiving lens 36 coupled to fixed support 34.

In operation, welder 16 is initially adjusted to a proper welding orientation by loosening set screws 88 and 94 and adjusting vertical tube 84 and enclosure 12 until the desired orientation of welder 16 is achieved. Set screws 88 and 94 are then tightened, which locks welder 16 in a welder position with respect to workpiece 14. FIG. 1 shows welder 16 welding on workpiece 14, with a section of filler wire 112 supplying filler metal. An image of the welding operation taken coaxially with electrode 64 through gas cup 20 is reflected by electrode mirror 56 to intermediate mirror 60, which in turn reflects the image along axis 71 through window 74 and flanged tubular support 80. Window 74 serves to confine the shield gas within enclosure 12 and ensures that the gas passes through opening 68 in gas shield cup 20 without leakage. After passing through window 74, the welding image is reflected by adjustable mirror 98 along axis 81 through fixed vertical support 34 to receiving lens 36. Lens 36 focuses the image on one end (not shown) of fiber optic bundle 38. Bundle 38 in turn passes the image to a filter unit 40, which contains an array of optical filters from which one or more filters is selected and placed in the image's path to filter light in the infrared and ultraviolet wavelengths from the image. Light in these wavelengths would otherwise "wash out" details from the image when displayed. The image is then passed to an enlarger 44, which enlarges the image 16 times its normal size. Thus, if a ¼-inch weld is being observed, it would be enlarged to about 4 inches, which provides more detail of the weld than would otherwise be viewable. Enlarger 44 focuses the enlarged welding image on camera 46, which in turn converts the image to a video signal and passes it to electronic eclipser 48. Eclipser 48, when used, electronically "clips" any part of the video signal that exceeds an adjustable threshold level, which in effect darkens the brightest parts of the image. This prevents the viewer from being distracted by the brightest parts of the image and reduces viewer eyestrain under certain welding conditions. At timees it becomes necessary to see the area around the welding arc, in which case eclipser 48 is not used. In either case, eclipser 48 then transmits the image to a video tape player 50 where the image is recorded. Video tape recorder 50 also passes the image to a monitor 52 where it is displayed for viewing as the welding operation proceeds.

From the foregoing, it is apparent that the applicants have provided a welding monitoring system which allows welder 16 to be readily positioned while leaving lens 36 and fiber optic bundle 38 undisturbed. This is done by utilizing a rotatable coupling 92 which allows welder 16 and enclosure 12 to be rotated in a vertical plane about axis 71 and a second, telescoping, rotatable coupling 96 which allows welder 16 to be adjusted in height as well as allowing rotation in a horizontal plane about axis 81.

We claim:
1. A welding monitoring system comprising:
   an enclosure having at least two parallel sides and first and second aligned openings located in said parallel sides, said first and second openings having a first axis perpendicular to planes of said first and second openings;
   a first mirror having an opening and a first reflective surface, said first mirror being mounted in said enclosure between said first and second openings, said first mirror being inclined 45° with respect to said first axis, and said first reflective surface being angularly oriented toward said first opening;

an elongated cylindrical housing open at one end, said housing positioned along and around said first axis;

coupling means for coupling said open end of said housing to said second opening in said enclosure, a welding electrode being extendable through said second opening in said enclosure, said opening in said first mirror, and said first opening in said enclosure;

a third opening in said enclosure, said third opening having a second axis perpendicular to a plane of said third opening, and said second axis being oriented perpendicular and to one side of said first axis;

a second mirror having a second reflective surface, said second mirror mounted in said enclosure adjacent said third opening, and said second mirror inclined 45° with respect to said second axis with said second reflective surface being angularly oriented toward said first mirror and said third opening;

a first elongated tubular support member having first and second ends and a third axis extending longitudinally through said first support member;

a second elongated tubular support member having first and second ends and a fourth axis extending longitudinally through said second support member, said second support member coupled at said first end to said second end of said first tubular member, with said third axis of said first support member perpendicular to said fourth axis of said second support member;

first rotatable coupling means for rotatably coupling said third opening of said enclosure to said first support member, said second axis of said third opening being in coaxial alignment with said third axis of said first tubular support member, whereby said welding electrode and said enclosure are rotatable about said second and third axes;

a third mirror having a third reflective surface, said third mirror mounted in an adjoining region between said first tubular support member and said second tubular support member, said third mirror inclined 45° with respect to said third and fourth axes, and said third reflective surface angularly oriented toward said second mirror and said second support member;

an image receiving means, including a lens, for receiving an image projected from said third mirror; and second rotatable coupling means for rotatably coupling said second tubular support member and said image receiving means, whereby said welding electrode and said enclosure are rotatable about said fourth axis, and an image of a welding operation taken through said first opening in said enclosure is projected by said first mirror to said second mirror, xand said second mirror projects said image to said third mirror, and said third mirror projects said image to said image receiving means.

2. A welding system as set forth in claim 1 comprising:

selectable optical filtering means having a light input and light output and including at least one optical filter for filtering selected wavelengths of light from said welding image;

flexible image transmission means having first and second ends, said first end of said transmission means coupled to said image receiving means and coupled at said second end to said optical filtering means for transmitting said welding operation image to said input of said optical filtering means;

enlarging means having an input coupled to said output of said optical filtering means and having an output for providing an enlarged welding image;

a camera coupled to said output of said enlarging means whereby a filtered and enlarged welding operation image is converted to an electrical signal;

recording means, including a video tape recorder, coupled to said camera for recording said electrical signal; and a television monitor coupled to said recording means whereby said electrical signal is converted to an optical image and displayed.

3. A system as set forth in claim 2 comprising a transparent material sealably positioned across said third opening between said rotatable coupling and said third opening in said enclosure.

4. A system as set forth in claim 3 comprising an elongated, cylindrical, gas shield coupled to said first opening of said enclosure.

5. A system as set forth in claim 4 comprising locking means in said first and second rotatable coupling means for independently locking said first and second rotatable coupling means in fixed, selected positions.

6. A system as set forth in claim 5 wherein said second rotatable coupling means comprises first and second tubular members in telescopic engagement.

7. A system as set forth in claim 6 wherein said flexible image transmission means includes a fiber optic bundle.

8. A system as set forth in claim 7 comprising adjustable mounting means for adjustably mounting said third mirror in said adjacent region.

9. A system as set forth in claim 8 comprising electronic clipping means for electronically clipping a portion of said electronic signal exceeding an adjustable threshold level, whereby said clipped portion of said signal becomes darkened when displayed by said monitor, said clipping means being electronically connected between said camera and said recording means.

10. A system as set forth in claim 9 wherein said first, second, and third mirrors are constructed of stainless steel.

* * * * *